United States Patent Office 3,046,310
Patented July 24, 1962

1

3,046,310
OXENIN INTERMEDIATE AND PROCESS FOR OBTAINING OXENIN
Joseph A. Kardys, Groton, Conn., assignor to Chas. Pfizer & Co., Inc., New York, N.Y., a corporation of Delaware
No Drawing. Filed Apr. 23, 1958, Ser. No. 730,239
11 Claims. (Cl. 260—617)

The present invention relates to the synthesis of vitamin A, more particularly to the purification of one of the intermediates in this synthesis. It is also concerned with new and useful compounds which are produced in the process of the present invention. The new and useful compounds are those formed by the interaction of oxenin and an alkali metal hydroxide.

It has previously been suggested to synthesize vitamin A from 1'-pentol and a 14 carbon aldehyde to produce oxenin which is purified and then converted to vitamin A. Some of these suggestions are reported in a number of literature articles, for example, J. Chem. Soc. 386 (1948); Chimia, 4,103 (1950); Ann. Reports, 46, 168 (1949); Vitamin and Hormones, 5,1 (1947); Helv. Chim. Acta, 30, 1911 (1947).

The chemical structure of oxenin is reported as:

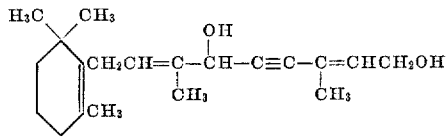

which is more exactly named 3,7-dimethyl-9-(2,6,6-trimethylcyclohexen - 1 - yl) - nona-2,7-diene-4-yne-1,6-diol, but, for convenience in this disclosure is referred to as "oxenin".

Among the objects of the present invention is an improved technique for preparing a vitamin A intermediate in purified form, suitable for direct use, without further extensive purifaction, in the synthesis of vitamin A. A more specific object of this invention is an improved method of purifying oxenin, a vitamin A intermediate, which method avoids the disadvantages of the prior art methods. Other objects of the present invention are made obvious in the following disclosure.

Oxenin may be prepared by any of the methods described in the above references. For example, oxenin may be prepared by the interaction of a 14 carbon aldehyde with the diGrignard salt of 1'-pentol in an ethereal solvent by the method described by Isler et al. in Helv. Chim. Acta. 30, 1911 (1947). The product is obtained in ethereal solution which after removal of ether leaves an oil. The residual oil is purified by high temperature, high vacuum fractional distillation or crystallization from suitable solvents. The 14 carbon aldehyde is represented by the following formula:

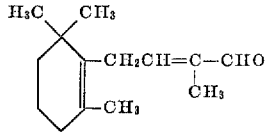

which is more correctly known as 2-methyl-4-(2,6,6-trimethylcyclohexen-1-yl)-but-2-enal.

1'-pentol is more correctly known as 3-methylpent-2-ene-4-yne-1-ol. The diGrignard salt of 1'-pentol is represented by the following.

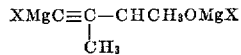

in which X is chlorine, bromine or iodine. This compound is prepared from 1'-pentol by treatment with lower alkyl Grignard reagents such as ethyl magnesium halide.

The purity of oxenin is an important factor in the subsequent step of the synthesis of vitamin A, which step involves the selective hydrogenation of the acetylenic bond of oxenin, to produce hydroxenin. Hydroxenin is 3,7 - dimethyl - 9 - (2,6,6-trimethylcyclohexen-1-yl)-nona-2,4,7-triene-1,6-diol. The hydrogenation step is particularly sensitive to the presence of impurities found in oxenin. The selective hydrogenation is effected using as catalyst, poisoned suspended palladium metal, for example, palladium on calcium carbonate poisoned with lead as described in U.S. Patent 2,451,740. The presence of small amounts of impurities in oxenin is found to further poison the catalyst thus leading to poor yields in the conversion to hydroxenin. Consequently, it is preferred to obtain oxenin in crystalline state since it is more easily purified than the liquid state. To obtain oxenin which is more amenable to hydrogenation, i.e. of high purity, costly and time-consuming recrystallization procedure must be employed, leading to lower efficiency in the recovery of oxenin from its reaction mixtures, mother liquors from its recrystallization, or concentrates thereof. For example, oxenin may be isolated in pure state from the oil obtained in the above described procedure, by dissolving the oil in a hexane-ether mixture and cooling the mixture to about —20° C. The crystalline oxenin thus formed may then be separated from the mother liquor and subsequently freed of traces of mother liquor by extensive repulping procedures employing suitable organic solvents, for example, hexane, ether, or benzene, at very low temperatures to minimize loss of product. In addition to being both time-consuming and costly, this process is frequently found to yield a product, i.e. oxenin, of varying degree of purity, which subsequently gives varying yields of hydroxenin or hydrogenation. Further, the production of crystalline oxenin is dependent on the purity of the intermediates, i.e. the 14 carbon aldehyde and 1'-pentol. 1'-pentol as produced from 3-pentol contains considerable amounts of a geometric isomer differing only in spatial arrangement which condenses with the 14 carbon aldehyde to form an isomeric oxenin-product. The isomeric oxenin-product lowers the melting point of oxenin and makes it difficult to purify. To obtain 1'-pentol the reaction mixture must be carefully fractionated by distillation at low pressure. Such a procedure requires considerable care and expense. Further, it is not completely efficient, there being substantial amounts of the undesired isomer in the fractionated product. The present process provides oxenin of higher purity than prior art processes by a method which is economical and suitable for large scale, industrial isolation and purification of oxenin. Further, oxenin as obtained from the valuable compounds of this invention is found free of hydrogenation catalyst poisons.

The process of the present invention is accomplished by adding to a source of impure oxenin an aqueous solution of an alkali metal hydroxide, thus precipitating an insoluble compound of oxenin, said compound containing alkali metal. The precipitate is of high purity and need only be freed of traces of mother liquor after its recovery from the reaction mixture. Recovery of the precipitate may be by any of the standard procedures employed in the art, such as filtration or centrifugation. For example, the solid product may be filtered and then washed with organic solvents which are compatible with the mother liquor. Particularly effective solvents are ether, benzene, hexane, acetone, toluene and the like. Aqueous solutions containing from about 5% to about 70% by weight of alkali metal hydroxide, for example, sodium, lithium or potassium hydroxide, are found suitable for the precipitation of the alkali metal-oxenin compound. Best results are obtained when employing from about 5% to about 50% aqueous solution of alkali metal hydroxide. Although the product forms almost immediately on contact of the reagents, it is preferred to allow the mixture to stand for periods of from about one to about twelve hours to obtain an almost quantative recovery of pure oxenin.

Crude oxenin may be employed in the process of the present invention in a variety of forms. For example, the crude oxenin may be in the form of a reaction product obtained by any of the methods described in the above cited art, for example, the Isler method. In this procedure the diGrignard salt of 1'-pentol is prepared by the addition of 1'-pentol to at least 2 moles of the Grignard reagent of ethylbromide. The so-formed diGrignard salt of 1'-pentol is next reacted with the above described 14 carbon aldehyde in ethereal solution and the mixture heated to form the Grignard salt of oxenin. Oxenin is then obtained by the acid decomposition of the reaction product. By "acid decomposition" as employed herein is meant the treatment with acid such as aqueous mineral acid, for example, sulfuric acid or hydrochloric acid, in at least an equivalent amount, of the Grignard salt of oxenin as produced in the above described manner. The treatment is usually effected by simply pouring the reaction mixture into the aqueous mineral acid and allowing the mixture to stand for about 15 minutes. Oxenin, of course, together with other organic materials remains dissolved in the ether layer while the magnesium salts produced by the acid decomposition dissolve in the aqueous layer. The organic layer is separated and may be concentrated under reduced pressure to obtain crude oxenin, i.e. oxenin together with organic impurities, as a residual oil. Such a reaction product dissolved in an inert solvent, or mother liquors from the crystallization of oxenin, or substantially solvent-free concentrates thereof may be employed in the present process. By "substantially solvent free concentrates" is meant the residue remaining after the removal of solvent from solutions of crude oxenin. The removal of solvents may be effected by any of the standard procedures commonly employed in the art, for example, concentration at reduced pressure. As is well known, such concentrates may contain minor amounts of solvent which remain dispersed in the product but rarely amount to more than 5% of the concentrate weight. For example, in the above described Isler procedure for producing oxenin, the ethereal solution of crude oxenin may be treated with aqueous alkali metal hydroxide, and alkali metal-oxenin compound precipitates. Alternatively, the crude oxenin obtained by concentration of said ether solution may be employed in the form of a solution in an inert solvent. If desired, a part of the crude oxenin may be recrystallized, for example, by the procedure described above, and the mother liquor, after removal of the crystalline oxenin, then treated with aqueous alkali metal hydroxide to obtain the remaining dissolved oxenin as the alkali metal-oxenin compound. The mother liquor may be used as such or concentrated to smaller volume if desired. By "inert solvent" as herein employed is meant a solvent which will not react with the alkali metal hydroxide or oxenin. Particularly effective are water-immiscible, liquid organic solvents, for example, saturated hydrocarbons, such as hexane, pentane, heptane, octane, etc.; aromatic hydrocarbons, such as benzene, toluene, xylene, etc.; dialkyl ethers, such as diethyl, methylethyl, dibutyl, dipropyl, diisopropyl ether and the like. Liquid ketones, such as acetone, ethylmethyl ketone, diethyl ketone, etc.; cyclic ethers, such as tetrahydrofuran and dioxane; and alkanols, such as methanol, ethanol, propanol, etc. may also be employed but are not preferred since their use may lead to reduced yield of alkali metal-oxenin product. The compounds of the present invention are found to be appreciably soluble in reaction mixtures containing such solvents and are fully precipitated only after prolonged cooling of the reaction mixtures. However, it is to be understood that such solvents may be employed in the process of the present invention.

At least an equimolar ratio of alkali metal hydroxide to oxenin is preferred to obtain optimum yield of product. However, this ratio is not critical since the alkali metal-oxenin compound forms even with less alkali metal hydroxide. Usually, it is preferred to employ excess of the alkali metal hydroxide since the actual oxenin content of a source of impure oxenin cannot easily be determined with certainty. Excesses of as much as 1000 mole percent have been employed with no apparent diminution of product yield. Further, the alkali metal hydroxides are relatively inexpensive reagents, the use of excess of which does not appreciably alter total process costs. It is preferred to agitate the reaction mixture to provide a more intimate contact of the reactants and consequently a faster reaction time. Agitation is not essential, however, since the product forms on contact of the reagents.

The new compounds of the present invention are alkali metal-oxenin compound, for example, sodium-oxenin, potassium-oxenin and lithium-oxenin compound which contain from about 1 to about 1.5 moles of alkali metal per mole of said compound. The exact nature of these compounds is not fully understood. They may be alkali metal hydroxide complexes of oxenin. However, regardless of their structure, these new compounds are particularly useful in that oxenin of very high purity may be recovered from same. The recovery may be conveniently effected by treating the alkali metal-oxenin compound with aqueous acid to produce pure oxenin and an alkali metal salt of the acid employed. For example, acids such as sulfuric, hydrochloric, phosphoric, carbonic, hydrobromic, organic acids such as acetic acid, propionic acid, benzenesulfonic acid, toluene-sulfonic acid and others may be used for this purpose. It is generally preferred to employ acids of appreciable water solubility to avoid unnecessary contamination of the alkali metal-oxenin compound although acids of low water solubility may be employed. The latter acids may be readily removed from the product by dissolving the product in suitable solvent and extracting with dilute alkali, for example, alkali metal carbonates or bicarbonates, in aqueous solution. Pure oxenin is produced as the alkali-metal oxenin compound reacts with the acid. The product may be filtered from the acid medium or extracted with a suitable water-immiscible inert organic solvent, for example, ether, benzene, hexane, and the like as described above. If crystalline oxenin is to be produced from the alkali metal compound, it is preferred not to use mineral acids since a reduced yield of product may be obtained. Mineral acids, i.e. sulfuric, hydrochloric and the like are found to cause appreciable decomposition of oxenin. To minimize such decomposition, the conversion to oxenin is preferably effected in the presence of an inert, water-immiscible organic solvent as described above which extracts oxenin from the acid reaction medium. Pure crystalline oxenin may then be obtained from the organic solvent by standard procedures, for example, evaporation of the solvent at reduced pressure. The residual material is purified oxenin. By "inert" is meant a solvent which does not react with the selected acid or oxenin. Hexane is a preferred solvent since a hexane solution or slurry of oxenin may be advantageously employed in the subsequent synthetic step leading to vitamin A, viz. selective hydrogenation to hydroxenin.

Oxenin, as purified by the above procedure, is found to give excellent reproducible results in the subsequent hydrogenation reaction. No noticeable poisoning of the hydrogenation catalyst is detected; in fact, the catalyst may be reused after recovery with little diminution in effectiveness.

The following examples are given by way of illustration and are not to be construed as limitations of this invention many variations of which are possible within the scope and spirit thereof.

EXAMPLE I

*Preparation of Oxenin*

The diGrignard salt of 23 g. (0.24 mole) of 1'-pentol was prepared by dropwise addition of 1'-pentol to the Grignard of 66 g. (0.6 mole) of ethylbromide in dry ether, over a period of 2 hours at a temperature of 20° C. The reaction mixture was vigorously stirred during addition of 1'-pentol. The reaction mixture was cooled to 15° C. and 50 g. (0.26 mole) of the 14-carbon aldehyde in 50 ml. of dry ether added dropwise with stirring and cooling to maintain the temperature at 15° C. The mixture was then refluxed for 1.5 hours and then poured slowly into a stirred mixture of 500 g. of crushed ice and 350 ml. of 15% sulfuric acid. After 15 minutes, the ether layer is separated and the aqueous phase extracted with three 100 ml. portions of ether. The combined ether layers were washed with water, saturated aqueous sodium bicarbonate and again with water. The ether solution was evaporated under reduced pressure to obtain 75 g. of orange oil which was crude oxenin.

EXAMPLE II

The crude oil product of Example I was taken up in 370 ml. of hexane and 20 ml. of dry ether. After filtering under nitrogen atmosphere, the mixture was cooled to 10° C. where crystallization started. The mixture was further cooled, with stirring to −20° C. and the mother liquor filtered off. The solid oxenin was repulped three times with 300 ml. of hexane and filtered. The original mother liquor was evaporated to 300 ml. at reduced pressure. To the resultant solution was added 50 ml. of 25% aqueous sodium hydroxide and the mixture stirred. A white precipitate of sodium-oxenin formed almost immediately. The mixture was stirred for 12 hours after which the precipitate was filtered, washed with hexane, and dried. The precipitate contained 1.5 moles of sodium per mole of sodium-oxenin.

EXAMPLE III

Twenty-five grams of the crude oil product of Example I was dissolved in 150 ml. of diethyl ether. To the resultant solution was added 50 ml. of 25% aqueous sodium hydroxide and the mixture stirred for one hour after which the white precipitate was filtered.

The precipitate, sodium-oxenin compound, was added to 100 ml. of 10% hydrochloric acid to which was added 150 ml. of ether. The mixture was stirred until clear. The ether layer was separated, washed with 5% sodium bicarbonate solution and evaporated to obtain 21 g. of pure oxenin, melting at 58.5–59° C.

EXAMPLE IV

The procedure of Example III is repeated employing 200 ml. of 5% potassium hydroxide to obtain a potassium-oxenin compound which was converted to oxenin with comparable results.

EXAMPLE V

The procedure of Example II is repeated employing lithium hydroxide to produce a lithium-oxenin compound which contained one mole of lithium per mole of compound.

EXAMPLE VI

The procedure of Example III is repeated employing hexane in place of ether. The hexane solution of pure oxenin is found suitable for the subsequent hydrogenation reaction to produce crystalline hydroxenin. Alternatively, it may be cooled to −20° C. to crystallize pure oxenin which is then filtered and dried.

EXAMPLE VII

The procedure of Example III is repeated employing 70% aqueous sodium hydroxide in place of 25% solution with comparable results.

EXAMPLE VIII

Ten grams of pure oxenin obtained by the procedure of Example II were dissolved in 50 ml. of hexane to which was then added 10 ml. of 25% aqueous sodium hydroxide. The mixture was stirred and after one hour sodium-oxenin compound was obtained in 98% yield. The product contained 1.2 mole of sodium per mole of compound.

EXAMPLE IX

The procedure of Example VIII was repeated employing a molar equivalent of sodium hydroxide with comparable results. The product contained one mole of sodium per mole of sodium-oxenin compound.

EXAMPLE X

To 2000 ml. of mother liquor from the recrystallization of oxenin (hexaneether solvent) containing 97 g. of crude oily residue was added 200 ml. of 25% aqueous sodium hydroxide. The mixture was stirred at room temperature for 3 hours. The sodium-oxenin product (which contains 1.5 moles of sodium per mole) was then filtered and washed with 50 ml. of hexane.

The product was transferred to a separatory funnel and 100 ml. of hexane added together with 300 ml. of 5% sulfuric acid. The mixture was agitated for five minutes, the aqueous phase removed and the organic phase then washed with 50 ml. of 5% aqueous sodium bicarbonate followed by 50 ml. of water. After separation, the organic phase was concentrated at reduced pressure to obtain 36 g. of a syrup which readily crystallized on standing to highly pure oxenin.

EXAMPLE XI

To a solution of 230 g. of a mother liquor concentrate from the recrystallization of oxenin in 450 ml. of benzene was added 100 ml. of 50% aqueous sodium hydroxide. The mixture was stirred for 6 hours. The crystalline product so produced was filtered and washed with 100 ml. of benzene. The product in 200 ml. of benzene was then treated with 300 ml. of 10% sulfuric acid and stirred for about 10 minutes.

Highly pure oxenin (74 g.) was then obtained from the organic layer by the procedure described in Example X.

EXAMPLE XII

One liter of ether extract obtained directly following a Grignard quench reaction similar to that described in Example I was treated with 200 ml. of 25% potassium hydroxide and the resultant mixture stirred for about 4 hours. The potassium-oxenin compound so formed was filtered and washed with 300 ml. of ether.

Crystalline oxenin (264 g.) was obtained by the procedure described in Example X employing ether and 10% hydrochloric acid.

EXAMPLE XIII

Fifty grams of the mother liquor concentrate used in Example XI was stirred in 100 ml. of 10% sodium hydroxide for 3 hours at room temperature. The crystalline sodium-oxenin compound is separated and then converted to 10 g. of oxenin by the procedure described in the previous examples.

EXAMPLE XIV

The procedure of Example III is repeated employing, in place of ether, the following solvents: diisopropyl ether, toluene, benzene, octane, dibutyl ether and heptane with comparable results.

EXAMPLE XV

The recovery procedure of Example III is repeated employing toluene, dibutyl ether, heptane, diisopropyl ether, methylethylether, and octane in place of diethyl ether with comparable results.

EXAMPLE XVI

The sodium-oxenin compound prepared in Example III was added to 100 ml. of glacial acetic acid. Crystalline oxenin separated immediately and was filtered and dried.

EXAMPLE XVII

The procedure of Example XVI was repeated employing aqueous carbonic acid, continuously saturated with carbon dioxide with comparable results.

EXAMPLE XVIII

The procedure of Example III was repeated employing tetrahydrofuran in place of diethyl ether. After stirring for four hours, the mixture was maintained under refrigeration for 5 days. The sodium oxenin compound was then filtered from the mixture and converted to pure oxenin by the usual procedure.

Similar results are obtained when employing acetone, methanol, ethanol, dioxane, methylethyl ketone and propanol.

What is claimed is:

1. The precipitate containing from about 1 to about 1.5 mols of alkali metal obtained by adding an aqueous solution of an alkali metal hydroxide to a solution of 3,7-dimethyl-9-(2,6,6-trimethylcyclohexen-1-yl)-nona-2,7-diene-4-yne-1,6-diol.

2. A product as claimed in claim 1 in which the alkali metal is sodium.

3. A product as claimed in claim 1 in which the alkali metal is potassium.

4. A process for obtaining 3,7-dimethyl-9-(2,6,6-trimethylcyclohexen-1-yl)-nona-2,7-diene-4-yne-1,6-diol in purified form which process comprises adding an aqueous solution of from about 5% to about 70% by weight of an alkali metal hydroxide to the crude diol, recovering resulting precipitated product and treating said product with acid to obtain the diol and alkali metal salt, said crude diol being obtained by the acid decomposition of a reaction product resulting from the treatment of 2-methyl-4-(2,6,6-trimethylcyclohexen-1-yl)-but-2-enal with the diGrignard salt of 3-methylpent-2-ene-4-yne-1-ol.

5. A process as claimed in claim 4 wherein the crude diol is dissolved in an inert organic solvent.

6. A process as claimed in claim 5 wherein the organic solvent is water-immiscible.

7. A process as claimed in claim 5 wherein the organic solvent is water-miscible.

8. A process as claimed in claim 4 wherein the crude diol is a substantially solvent-free concentrate thereof.

9. A process for obtaining 3,7-dimethyl-9-(2,6,6-trimethylcyclohexen-1-yl)-nona-2,7-diene-4-yne-1,6-diol in purified form which process comprises adding an aqueous solution of from about 5% to about 70% by weight of an alkali metal hydroxide to the crude diol, recovering resultant precipitated product, acid-decomposing recovered resulting product to obtain 3,7-dimethyl-9-(2,6,6-trimethylcyclohexen-1-yl)-nona-2,7-diene-4-yne-1,6-diol and an alkali metal salt, and recovering 3,7-dimethyl-9-(2,6,6-trimethylcyclohexen-1-yl)-nona-2,7-diene-4-yne-1,6-diol, said crude diol being obtained by the acid decomposition of a reaction product resulting from the treatment of 2-methyl-4-(2,6,6-trimethylcyclohexen-1-yl)-but-2-enal with the diGrignard salt of 3-methylpent-2-ene-4-yne-1-ol.

10. A process as claimed in claim 9 wherein the recovery of 3,7-dimethyl-9-(2,6,6-trimethylcyclohexen-1-yl)-nona-2,7-diene-4-yne-1,6-diol is effected by filtration.

11. A process as claimed in claim 9 wherein the recovery of 3,7-dimethyl-9-(2,6,6-trimethylcyclohexen-1-yl)-nona-2,7-diene-4-yne-1,6-diol is effected by solvent extraction.

References Cited in the file of this patent

UNITED STATES PATENTS

| | | |
|---|---|---|
| 1,978,647 | Olson et al. | Oct. 30, 1934 |
| 2,451,739 | Isler | Oct. 19, 1948 |